March 16, 1965 R. C. MYERS ETAL 3,173,981
ARCH TORCH FURNACING MEANS AND PROCESS
Filed Sept. 24, 1962 3 Sheets-Sheet 1

INVENTORS
RICHARD C. MYERS
DAVID A. HAID
BY Leo A. Plum, Jr.
ATTORNEY

March 16, 1965  R. C. MYERS ETAL  3,173,981

ARCH TORCH FURNACING MEANS AND PROCESS

Filed Sept. 24, 1962  3 Sheets-Sheet 2

INVENTORS
RICHARD C. MYERS
DAVID A. HAID
BY Leo A. Plum, Jr.
ATTORNEY 3,173,981
ARCH TORCH FURNACING MEANS AND
PROCESS
Richard C. Myers, Scotch Plains, N.J., and David A.
Haid, Kenmore, N.Y., assignors to Union Carbide Corporation, a corporation of New York
Filed Sept. 24, 1962, Ser. No. 225,794
15 Claims. (Cl. 13—9)

This invention relates to novel furnacing apparatus and processes for treating conductive materials. More particularly, the present invention relates to novel furnacing apparatus and processes for generating within a molten metal bath uniform, continuous and controllable forces which produce a predictable and controllable stirring action within the bath while it is simultaneously being heated by a directionally stable electric arc column.

It is often necessary to provide stirring action in a bath of molten metal during melting or refining to promote homogeneity. It is also necessary to induce motion in a metal bath by stirring methods or gas evolution to promote uniform distribution of heat content. When melting in the presence of a reactive atmosphere, frequently gas evolution such as evolution of carbon oxides is sufficient to produce the necessary agitation of the bath to thereby effect heat distribution. In contrast, when melting in the presence of an inert atmosphere, the utilization of bath stirring means is imperative since there is little or no carbon oxide evolution.

In the case of an induction melting furnace, the electromagnetic field which surrounds the furnace to produce heat in the metallic charge by means of eddy currents also produces violent stirring action in the melt through the interaction of the eddy currents and the electromagnetic field. Thus the heat source inherently provides bath stirring.

Induction stirring means are also used in furnaces which do not use induction coils for heating. For example, induction stirring may be used in an open arc electric furnace or a fuel-fired combustion furnace. The induction stirring coils in this case may be located underneath the furnace whereby a time varying magnetic flux penetrates nonmagnetic furnace walls to generate eddy currents and exert the forces for stirring. Another example of induction stirring involves a nontime varying magnetic field (D.C. source) emanating from a rotor located beneath the furnace which provides a spatically moving field capable of producing stirring forces within the conductive bath. Each of these methods requires the provision of apparatus and power sources distinct and separate from the heat source. Additionally they demand that nonmagnetic materials be used in the construction of the furnace to reduce hysteresis losses and that electrically conductive structural components within the influence of the inductive magnetic field be subdivided into a multiplicity of small pieces electrically isolated one from the other to reduce eddy current losses.

In another system (British Patent 554,229) a coil is arranged under an electric furnace to provide an alternating magnetic field synchronous with the alternating currents introduced into the melt by the electrodes to produce stirring action. Because the magnitude of the arc current varies widely, continuously and erratically in a conventional electric arc furnace, auxiliary equipment in the form of electrode positioners is invariably utilized. Coincident with any change in arc current magnitude a corresponding change in phase relationships results. Inasmuch as the magnitude and the direction of stirring forces within a bath are determined by the instantaneous phase relationship between interacting current and magnetic field, it is necessary to provide a phase shifting device in the magnetic field supply to maintain a preferential stirring motion in the bath. A current trace of a typical graphite electrode arcing to a metal bath shows current variations of ±20,000 amperes occurring almost continuously in a random and erratic pattern. Generally a total of three electrodes, varying independently, comprise a typical system of this type. The inherent difficulty of attempting to vary the phase relationship of a magnetic field with respect to three independently varying arc currents is apparent.

It is an object of the present invention to provide a novel furnacing means including stirring, wherein a specific type of electric arc column is utilized as a heat source as well as a component in a novel stirring mechanism.

Another object of the invention is to provide a stirring and furnacing mechanism in which the electric arc current is sufficiently invariant so that its interaction with an invariant magnetic field results in uniform and continuous stirring force.

It is still another object to provide an electrode connection at any predetermined location on the face of a molten bath contained in a furnace hearth commensurate with the requirements of a predetermined stirring pattern.

It is a further object to provide a novel furnacing device employing a uniform and low voltage gradient electric arc column uniquely suited to function as an integral part of the stirring mechanism; namely as an electric commutator.

Apparatus of the present invention comprise a furnace chamber having a melting crucible or hearth therein, electrode means protruding through the hearth or crucible and contacting conductive charge material to be held therein, means for generating a magnetic field passing through the melting hearth or crucible and through the conductive charge material to be held therein, and means for providing and directing a directionally stable transferred electric arc heater-commutator into electrical contact with said conductive charge materials to be held in said crucible or hearth so as to provide a thrust, by interaction of the magnetic field and the current flowing in the electric arc, on molten charge material to be positioned in the melting hearth, said thrust being mutually perpendicular to the direction of current flow in the molten charge and the direction of the magnetic field. The means for generating the magnetic field and the means for providing a directionally stable transferred electric arc heater-commutator being adaptable for electrical connection in an electrical circuit with an electrical power supply. The directionally stable electric arc fulfills two essential functions; namely, the arc is a heating source as well as an integral part of the stirring mechanism, namely a flexible commutator.

Process of the present invention comprise providing electrically conducting charge material in a melting crucible or hearth within a furnace chamber, establishing and maintaining a magnetic field passing through the charge material and contacting the electrically conducting charge material with a directionally stable electric arc heater-commutator so as to cause a thrust on the charge material, said thrust being mutually perpendicular to the direction of current flow through the electrically conductive material and the direction of the magnetic field, thereby melting and stirring the electrically conductive charge material upon fusion thereof.

The stirring action in the above-described furnace results from the reaction of the magnetic field in the crucible with the current passing via the molten charge between the directionally stable electric arc column and electrode means in the crucible. Of course the charge material must be electrically conductive and includes metals, metal alloys, and oxides and salts which at least partially ionize in the molten state. A current carrying conductor located in a magnetic field at right angles to the magnetic flux will experience a force in a direction perpendicular to both the plane of the flux and the path of the current when the conductor and plane of the flux have components which are at right angles to one another, and to the right angle vector of the current path when they are not at right angles.

While the present invention employs the aforementioned technology to develop a thrust on the bath, the present invention employs an essentially directionally stable transferred electric arc column functioning essentially as a heater and as a flexible commutator. The heater-commutator function of the arc column is explained in detail hereinafter.

The present invention utilizes directionally stable and directionally controllable electric arcs. The directionally stable and directionally controllable electric arcs may be single phase A.C., pulsating D.C. or D.C. arcs. The phrase "directionally stable" when used herein and in the claims describes an electric arc column in which the longitudinal axis or axes coincident with the flow of current remains invariant in direction or fixed in direction regardless of the type gas or vapors in the surrounding environment. The phrase "directionally controllable" is used herein to describe an electric arc column wherein the longitudinal axis or axes coincident with the direction of current flow can be varied from an angle of 90° to an angle of about 15° C. to the surface of the conductive material to be treated without substantial curvature of the arc column. A characteristic of such directionally stable and directionally controllable electric arc columns are their amenability of being extended to relatively long lengths, as long as 48 inches and longer without being extinguished.

These are several methods of producing and maintaining the arcs of the present invention one of which is disclosed in U.S. Patent No. 2,806,124 issued September 10, 1957. In general, the term "arc torch" will be used herein generically to indicate the various means for producing directionally stable transferred electric arcs. The term "transferred" is used herein to characterize an electric arc wherein the current flow is between a non-consumable electrode in the arc torch and the metallic charge material. The term "straight polarity" is used herein to characterize an electric arc wherein the extremity of the arc contacting the conductive material is the anoidic extremity and the term "reverse polarity" is used herein to characterize an electric arc wherein the extremity of the arc contacting the conductive material is the cathodic extremity.

One method for establishing a directionally stabilized arc column comprises forming a quasi-electrode between a non-consumable electrode and the crucible by first striking an arc therebetween, surrounding the electrode with an annular gas stream, subsequently directing at least a portion of said gas stream by means of a cold wall nozzle into intimate contact with said arc, thereby directionally stabilizing the same and wherein a portion of the gas stream is ionized to form an extremely stable arc path.

It has been found that the gas upon entrance into the furnace need not surround the non-consumable electrode nor that it necessarily be directed into contact with the arc column by means of a cold wall nozzle. Rather the gas stream need only be a confined flow of gas directed to contact the electric arc column near the non-consumable electrode and envelope the arc column at least near the non-consumable electrode; the flow vector of the gas being generally in the direction of the melt itself. Although various means for producing directionally stable arcs are known, it is necessary in the present invention to produce directional stability by flowing gas into contact with the arc column, and preferably in a manner so as to shield the electrode from contaminating furnace atmosphere and metal particles and vapors. The use of a flowing stream of gas to directionally stabilize the arc column is necessary in the present invention since the flowing stream of gas performs several other important functions in addition to stabilizing the electric arc column itself. Directionally stable arcs produced by whirling gas streams about the arc column generally in the direction of the charge material near the non-consumable electrode tip may also be employed in producing the directionally stable arcs utilized in the present invention. The later method and apparatus are fully explained in U.S. patent application Serial No. 223,484 filed September 13, 1962, by Robert J. Baird.

Figure 1:
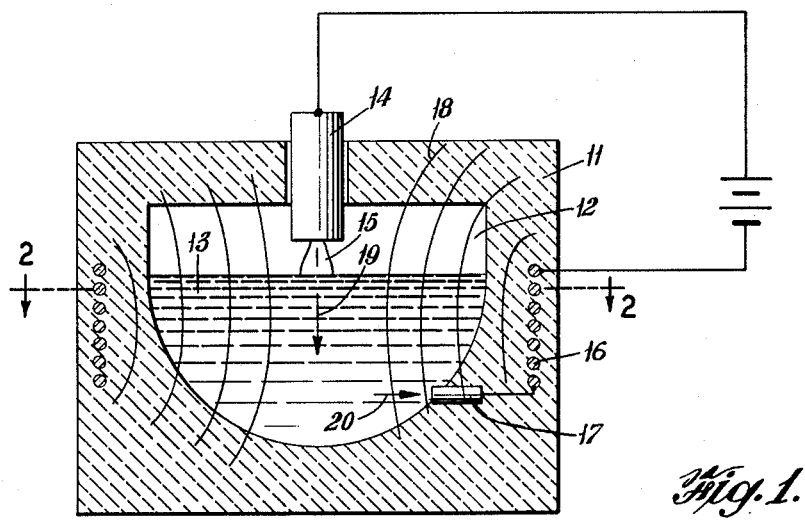
FIG. 1 is a diagrammatic representation taken along a vertical cross-section of a furnace showing a field coil arranged in series relationship with means for producing and directing a directionally stable transferred arc heater-commutator into contact with a molten conductive bath.

In FIG. 1, a furnace 11 is shown with a melting crucible or hearth 12 containing a pool of molten metal or other conductive charge material 13. An arc torch is arranged to direct a directionally stable transferred arc 15 into contact with the conductive charge material.

The arc torch 14 comprises an internal non-consumable electrode and a nozzle having a central passage in axial alignment with the electrode. The transferred arc torch electrode is electrically connected to the negative side of a suitable D.C. source of electrical power. The positive side of the power supply is connected through field coil 16 to the bottom electrode 17 in the wall of the furnace and set off-center in the curcible so that it contacts the charge material at the side of the crucible. This arrangement results in production of a directionally stable straight polarity transferred electric arc column. The arc torch electrode may alternatively be connected to the positive side of a suitable D.C. source of electrical power. In the latter arrangement the arc column would be a directionally stable transferred reverse polarity arc column.

In the operation of the arc torch furnace, an arc is struck between the arc torch electrode and the charge material with current passing between the torch electrode and the bottom electrode through the conductive charge material. An annular gas stream is at the same time introduced into the torch and at least a portion of the gas stream is brought into intimate contact with the arc and the arc column is directionally stabilized to form an extremely stable arc path to the charge material.

Figure 2:
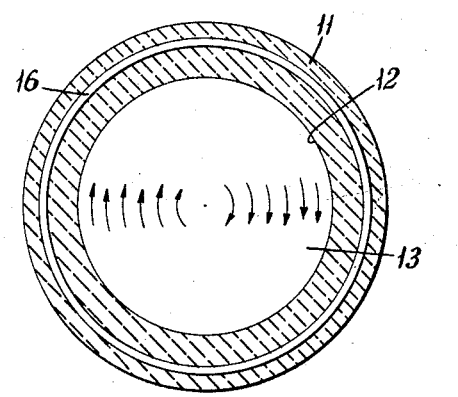
FIG. 2 is a cross-sectional view along plane 2—2 of FIG. 1 showing the direction of motion of the molten conductive material during stirring by an arrangement similar to that shown in FIG. 1.

The field coil 16 is wound here with its axis coincident with the vertical axis of the furnace. The passage of the same current which energized the torch through this coil generates a magnetic field with vertical flux lines 18. The path of the current, as shown by the arrow 19, from the arc torch through the molten charge forms the current conductor which interacts with the magnetic field to produce the stirring action. Only the current vector perpendicular to the direction of the flux reacts with the flux 18 to produce a force or thrust on the charge material. The horizontal component of the current, designated the horizontal current vector, is shown by the arrow 20 intersecting the vertical flux lines 18 at right angles therewith. By application of the left hand rule of current conductor-magnetic field interaction, it is seen that this arrangement causes a tangential force on the conductive charge material whereby a spinning motion is imparted to the fused charge material as shown by the arrows in FIG. 2.

Figure 3:
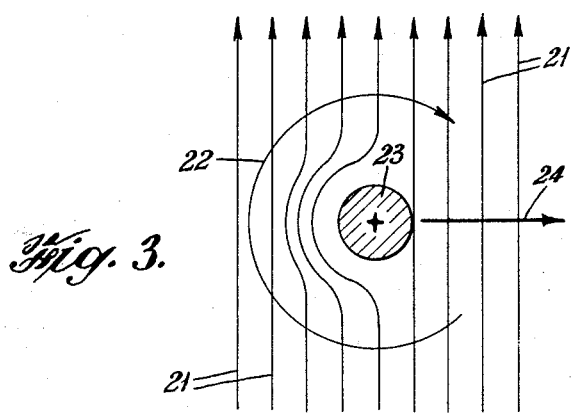
FIG. 3 is a diagrammatic representation of a magnetic flux-current conductor interaction producing the stirring thrust.

In FIG. 3 a diagrammatic representation of the current conductor-magnetic flux interaction is shown. The vertical lines 21 represent the flux lines created by the magnetic field. The arrows show the field to have its north pole at the top and south pole at the bottom. The circular line 22 represents the flux created by the current conductor 23 seen carrying current into the page and thereby creating clockwise flux. The interaction of the lines is shown diagrammatically to produce the force arrow 24.

Figure 4:
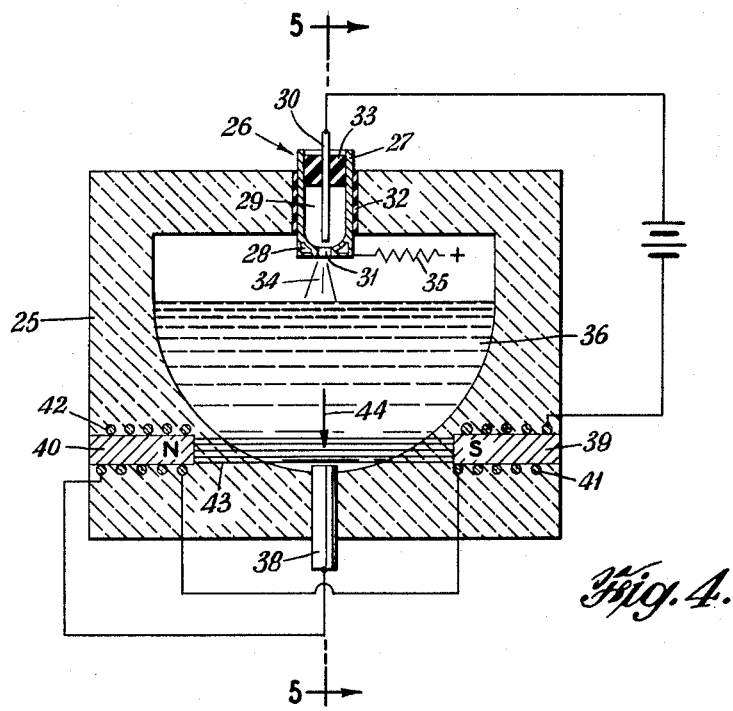
FIG. 4 is a diagrammatic representation of a furnace showing another embodiment of the invention wherein field coils are arranged to produce horizontal flux lines, as shown in a vertical cross-section.

In FIG. 4 another stirring arrangement is shown. As before, a furnace 25 is shown with an arc torch 26 consisting of a metal nozzle 27 having an annular passage 28 through which a suitable coolant, such as water, is circulated to keep cool the inner walls of a central arc passage 29 in the nozzle. The coolant inlet and outlet are not shown. An electrode 30 is mounted within said passage 29 in axial alignment therewith. The tip of the electrode 30 may be either above 31 the nozzle passage, or located flush with the outlet of the nozzle or below the nozzle. The nozzle is insulated 32 and 33 from the furnace and from the electrode. The electrode 30 is electrically connected to the negative side of a suitable D.C. source of electrical power. A gas flows under pressure into the arc torch and out the passage 29 to form the effluent 34 of the arc torch.

The cold-walled nozzle directs the annular gas stream into intimate contact with the arc whereby a portion of the gas stream is ionized and directionally stabilized to provide the stable arc path or column to the melt. These terms are discussed further in U.S. Patent 2,806,124 issued September 10, 1957.

Figure 5:
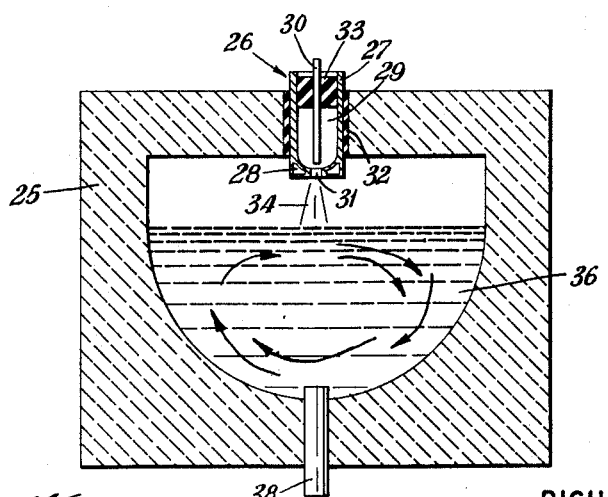
FIG. 5 is a cross-sectional view of the furnace of FIG. 4 taken along plane 5—5 showing the direction of motion of the molten conductive material during stirring.

In operation a pilot arc may first be established between the electrode tip 31 and the nozzle by means of a ballast resistor 34 connected to the positive side of the power source. The main arc is then established between the electrode 30, a charge material 36, and a bottom electrode 38. Here the bottom electrode 38 is located on center in the bottom of the hearth while the magnetic field generating means consisting of field poles 39 and 40 are arranged on opposite sides of the furnace or inside the walls of the furnace as shown. Coils 41 and 42 are connected to the positive side of the power source and then wound on the cores 39 and 40 to give a north and south pole as shown and the circuit then completed to the bottom electrode 38. With this arrangement the flux lines 43 are horizontal while the current path 44 is vertical resulting in a movement of fused conductive charge material in a direction into the page as shown in the side view of FIG. 5. This produces a rolling motion which efficiently moves molten charge material from the bottom to the top of the melt rather than the non-uniform swirls produced here and there by eddy current stirring mechanisms.

It is seen from the two basic arrangements described above that the invention utilizes the arc torch current both for heating of the furnace and as the source of the electro-magnetic field. The invention therefore has the advantage of not requiring a separate power source as in other stirring arrangements for the current necessary for stirring may be considered a by-product of the transferred arc torch. Additionally the current in the torch and the current energizing the field coil are always in phase regardless of the power source utilized. This phase identity, which is the result of the series relationship of the coil and transferred arc torch, not only does away with the need for phase-adjusting equipment, but also provides the maximum amount of stirring available from a given current and coil combination.

Also very importantly, the directionally stable transferred electric arc provides a unique commutator as an integral and essential component of the stirring mechanism. Directionally stable electric arc columns, as previously mentioned, are characterized by the fact that they will maintain a given direction coincident with the direction of current flow. They are in addition elastic because of a relatively low voltage gradient and will readily extend in length, without change in direction or extinguishment. Therefore, they are responsive to a change in distance between the electrode in the arc torch device and the molten conducting material. The present invention employs this aspect of the directionally stable arc to provide process and apparatus employing directionally stable electric arc columns as a unique commutator in the stirring mechanism of the present invention. Contrary to the erratic open arc emanating from graphite electrode of the prior art, the present invention suffers no carbon contamination, no intermittent cessation of the stirring force and heat input to the bath, and no arc-out periods.

In addition many other advantages are achieved by the present invention. For example, in the present process the direction and degree of stirring can be controlled, without repositioning either the point of entrance of the arc torch into the furnace or the position of the bottom electrode, by changing the position of the foot of the directionally stable electric arc heater-commutator to contact the molten bath at the desired point on the surface of the bath required to impart the desired motion in the bath. Also the motion of the foot of the directionally stable electric arc heater-commutator over the surface of the bath can be controlled to produce a smoothly changing stirring motion in the bath of any desired pattern.

The stirring force produced by the interaction of the current and the magnetic flux is proportional only to that component of the current which intersects the plane of the magnetic flux at right angles. A mutual perpendicularity is required to produce the stirring forces. The direction of the current path is altered by adjusting the relative positions of the arc torch and the bottom electrode. The path of the current will be the shortest connecting path between the two. The position of the arc torch may, of course, be varied from that shown in the drawings. Because the arc torch effluent is stabilized as a column, it may be directed at the molten bath at an angle instead of straight down in a case where such design is necessary to fit the needs of a particular furnace.

The geometry of the magnetic field is dependent on the shape and position of the field coils. The number of turns will determine the strength of the magnetic field. The magnitude and direction of the forces generated is given by the vector equation $$F = J \times B$$

where F is the force per unit volume of molten material, J is the current density, and B is the field strength.

As seen in the basic arrangements of FIGS. 1 and 4, the torch and field coils are arranged so that the magnetic field flux lines are substantially perpendicular to the arc torch current path in the molten bath. The bottom electrode in the arrangement of FIG. 1 is therefore located off-center in the crucible for if it were located in the center of the bottom of the crucible, then the current path would not intersect the flux lines to produce a stirring action. It is in this sense that there must be at least a vector component of the direction of the current path in the melt which is perpendicular to the flux lines of the magnetic field.

A distinct and considerable advantage of the present invention is the ability not only to smoothly control the direction of stirring, i.e. stirring pattern, but in addition to control the intensity of stirring without changing the magnetic field strength, current density or position of the arc torch. It is readily apparent that if the current density or magnetic field strength is changed the amount of thrust on the metal will be increased or decreased. By the same token, if, for example, the position of the arc torch 14 in FIG. 1 were moved closer to the edge of the molten conductive material the magnitude of current vector 20 would diminish to zero and the thrust on the conductive material would diminish to zero. Since the directionally stable electric arc columns of the present invention are also directionally controllable, without moving the point of entrance of the arc torch through the furnace roof, the arc torch can be pointed to impinge the foot of the directionally stable arc column at any desired position on the surface of the conductive charge material and thereby control the magnitude of current vector 20. In this manner the thrust exerted on the total bath can be smoothly controlled. Although the force per unit volume ($j \times B$) is still the same, less metal volume experiences this force and the total force on the total bath decreases. Carried to the extreme, stirring could be stopped by shifting the position of the foot of the arc column to a point directly above the bottom electrode thereby diminishing the magnitude of current vector 20 to zero. Thus the present invention permits an artisant to vary the intensity of stirring from and including no stirring to intense stirring without extinguishing the electric arc or adjusting or stopping current flow in the system.

While the field coils are energized by the transferred arc torch current, these coils and the resulting stirring action may, of course, be controlled independently of the arc torch control by means of a simple field tap arrangement across the coils whereby a number of turns of the coils actually energized may be varied.

In an embodiment of the invention a transferred arc torch furnace of 50 pound capacity was heated by a 500 ampere arc torch rated at 50 kw. The torch was arranged vertically above the center of the crucible. A one inch diameter bottom electrode was positioned off-center in the side of the crucible near the bottom.

The field coil consisted of a seven turn, 15 inch diameter coil wound around the furnace with the axis of the coil coincident with the vertical axis of the furnace. The arrangement of the torch, field coil and bottom electrode was thus similar to that shown in FIG. 1.

The field coil consisted of ¾ inch water-cooled copper tubing. A 50 kw. D.C. power supply was used with the torch connected to the negative side and the field coil and bottom electrode connected to the positive side, the circuit being completed through the melt. In operation, the furnace was charged with solid metal and a spinning of the melt was observed as soon as molten metal formed. The stirring action was found to impart a spin of 60 r.p.m. to the bath.

While the invention is described in reference to metallic charges, it is also operable with non-metallic charges in other refining or melting operations, provided only that they are electrically conductive. For example electrically conductive metallic salts or slags may be effectively stirred in this furnace. Additionally it is to be noted that the gaseous stream used with the arc torch is not limited to argon, but may be nitrogen or other gases or a mixture of gases depending on the nature of the treating or melting operation desired and on the type of arc torch used. The power supply may be in addition to D.C., pulsating D.C. and single phase A.C.

A single phase A.C. power supply can be used but precautions must be taken to minimize, or preferably avoid, eddy current losses in the furnace shell, such as by using non-magnetic construction materials. Since the torch and field coils are in series relationship, the changes in the intensity of the current and the magnetic fields are in phase and will not destroy the stirring action.

The present invention in addition to providing a highly flexible stirring operation, in addition solves problems encountered in large scale melting operations utilizing a directionally stable electric arc column as a heating source in melting operations conducted under substantially inert atmospheres. The arc spot of a directionally stable electric arc column is a highly concentrated and constant source of heat energy. While this is of great advantage in achieving very high temperatures, it has been found that there is some difficulty in achieving highly efficient melting in that thermal conductivity alone is incapable of transferring sufficient heat to the extremities of the charge.

In normal large scale melting processes, "carbon boil" i.e. evolution of carbon oxides in the melt during melt-down causes a great deal of agitation in the melt and aids substantially in transferring heat throughout the melt. In melting processes utilizing an arc torch in a substantially inert atmosphere, there is little or no carbon boil and the bath remains rather immobile in the melting crucible or hearth. As a consequence, it has been found that melting without formation of a substantially large skull in the bottom of the hearth is difficult unless power input is increased quite appreciably.

Figure 6:
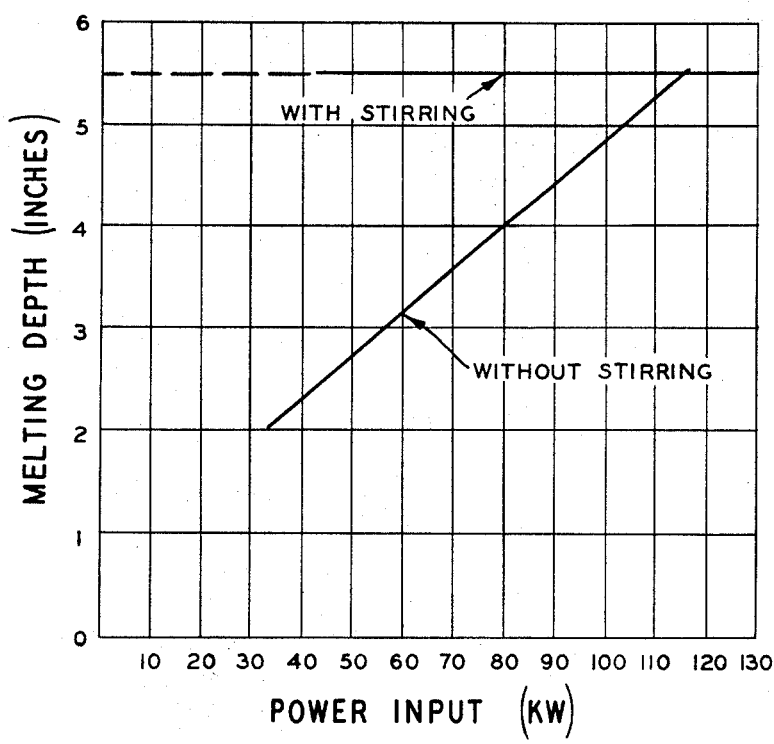
FIG. 6 is a graphical representation showing the increased melting rate achieved when the present invention is employed.

To illustrate this effect, reference is made to FIG. 6 wherein a graphical representation shows the progressively higher power inputs required to melt to a given depth without stirring in sharp contrast to the melting depth achievable utilizing the stirring process of the present invention. The data for the graphs in FIG. 6 was secured on a furnace of 300 pound capacity having a spherical shaped hearth of 22" diameter and 5½" depth at the center. The metal melted was AISI 4340 although the same general effect has been shown with alloy such as A286, Rene 41 and other metals such as copper and aluminum. The general increase in melting depth for a given power supply with the stirring mechanism of the present invention would be experienced with all conductive materials.

While the present invention has been described with some degree of particularity, it is contemplated that minor variations may be made without departing from the spirit and scope thereof.

What is claimed is:

1. A process for melting and stirring conductive charge materials contained in a hearth having an electrode in contact with said conductive materials comprising introducing a magnetic field into said conductive charge materials, establishing and maintaining a directionally stable transferred electric arc heater-commutator in electrical contact with said conductive materials and flowing electric current through said electrode and said electric arc heater-commutator and through said conductive charge materials, the direction of said current flow in said conductive charge materials and the direction of said magnetic field having mutually perpendicular components to melt and stir said conductive charge materials.

2. A process in accordance with claim 1 wherein said conductive charge materials are metallic materials and said current is direct current.

3. A process in accordance with claim 1 wherein said conductive materials are metallic materials and said current is pulsating direct current.

4. A process in accordance with claim 1 wherein said conductive materials are metallic materials and said current is single phase alternating current.

5. A process in accordance wth claim 1 wherein said transferred directionally stable electric arc is a straight polarity direct current arc.

6. A process in accordance with claim 1 wherein said transferred directionally stable electric arc is a reverse polarity direct current arc.

7. A process for melting and stirring conductive charge materials contained in a hearth having an electrode in contact with said conductive charge materials comprising introducing a magnetic field into said conductive charge materials, establishing and maintaining a directionally stable transferred electric arc heater-commutator in electrical contact with said conductive charge materials and flowing direct electric current through said electrode and said electric arc heater-commutator and through said conductive charge materials, the direction of said current flow through said conductive material having a component perpendicular to a component of the direction of said magnetic field, and adjusting the direction of said current flow and said magnetic field to cause said conductive charge material to continuously roll, upon fusion thereof, within said hearth, about a horizontal axis through said hearth.

8. A process for melting and stirring conductive charge materials contained in a hearth having an electrode in contact with said conductive charge materials comprising introducing a magnetic field into said conductive charge materials, establishing and maintaining a direct current directionally stable transferred electric arc heater-commutator in electrical contact with said conductive charge materials and flowing direct current between said electrode and said electric arc heater-commutator through said conductive charge materials, the direction of said current flow through said conductive material essentially having a component perpendicular to a component of the direction of said magnetic field, and adjusting the direction of said current flow and said magnetic field to cause said conductive charge material to continuously move, upon fusion, within said hearth in a circular direction about the central vertical axis of said hearth.

9. An apparatus for furnacing and stirring conductive charge materials comprising a furnace chamber, hearth means positioned within said furnace chamber for containing conductive charge materials, electrode means protruding through said hearth and electrically contacting conductive charge material to be held within said hearth means, means for producing a magnetic field in conductive charge materials to be held in said hearth means, and means for providing and directing a directionally stable transferred electric arc heater-commutator into electrical contact with said conductive charge materials to be held in said hearth means, said means providing said directionally stable transferred electric arc heater-commutator and said means producing said magnetic field being adoptable for electrical connection in electrical circuit with an electrical power supply and positioned to produce mutual perpendicularity between components of the directions of the magnetic field and the current flow in said electric arc.

10. An apparatus in accordance with claim 9 wherein said means producing a directionally stable transferred electric arc and said means producing a magnetic field adoptable to connection in series relationship with said electrical power supply.

11. An apparatus in accordance with claim 9 wherein said electric power supply is a direct current power source.

12. An apparatus in accordance with claim 9 wherein said electric power supply is a pulsating direct current power source.

13. An apparatus in accordance with claim 9 wherein said electrical power supply is a single phase alternating current power source.

14. An apparatus for furnacing and stirring conductive charge material comprising a furnace chamber, hearth means positioned within said furnace chamber for containing conductive charge materials, electrode means protruding through said hearth means and contacting conductive materials to be held within said hearth means, said electrode means being positioned off the bottom center of said hearth means, a coil of electrical current conducting material positioned to encircle conductive charge material to be held within said hearth means, means supplying a flow of direct current, and an arc torch positioned to direct a directionally stable transferred electric arc heater-commutator into electric contact with conductive charge material to be held within said hearth means, said arc torch comprising an internal non-consumable electrode, a water cooled nozzle having a central passage and positioned concentric with said non-consumable electrode, and means providing a stream of gas flowing through said water cooled nozzle, said means providing a flow of direct current and said coil of electrical current conducting material and said non-consumable nozzle of said arc torch being connected in series relationship.

15. An apparatus for furnacing and stirring conductive charge materials comprising a furnace chamber, hearth means positioned within said furnace chamber for containing conductive charge materials, electrode means protruding through said hearth means and contacting conductive materials to be held within said hearth means, said electrode means being positioned approximately in the bottom center of said hearth means, two coils of electrical current conducting material surrounding a core of magnetic field conducting material having high magnetic permeability said coils and cores being positioned on opposing sides of said hearth means and near the bottom of said hearth means, means supplying a flow of direct current, and an arc torch positioned to direct a directionally stable transferred electric arc heater-commutator into electrical contact with conductive charge material to be held within said hearth means, said arc torch comprising an internal non-consumable electrode, a water cooled nozzle having a central passage and positioned concentric with said non-consumable electrode, and means providing a stream of gas flowing through said water cooled nozzle, said means providing a flow of direct current and said coil of electrical current conducting material and said non-consumable nozzle of said arc torch being connected in series relationship.

References Cited in the file of this patent

UNITED STATES PATENTS

| | | |
|---|---|---|
| 1,562,825 | Evreynoff | Nov. 25, 1925 |
| 3,102,946 | Fonberg | Sept. 3, 1963 |

FOREIGN PATENTS

| | | |
|---|---|---|
| 866,106 | Great Britain | Apr. 26, 1961 |